United States Patent
Kasper et al.

(10) Patent No.: US 9,958,836 B2
(45) Date of Patent: May 1, 2018

(54) DYE-BASED TIME INDICATING LABEL WITHOUT INITIAL GRAY TIME

(71) Applicant: Brady Worldwide, Inc., Milwaukee, WI (US)

(72) Inventors: Matthew M. Kasper, Oak Creek, WI (US); Harry J. Miesner, Jr., Wauwatosa, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 198 days.

(21) Appl. No.: 15/151,695

(22) Filed: May 11, 2016

(65) Prior Publication Data

US 2017/0329285 A1    Nov. 16, 2017

(51) Int. Cl.
  *G04F 13/00*   (2006.01)
  *G01K 3/04*    (2006.01)
  *G09F 3/00*    (2006.01)

(52) U.S. Cl.
  CPC ............... *G04F 13/00* (2013.01); *G01K 3/04* (2013.01); *G09F 3/0291* (2013.01)

(58) Field of Classification Search
  CPC . G01K 3/00; G01K 3/04; G01K 11/12; G01K 11/14; G01K 11/16; G01N 21/78; G01N 31/22; G01N 31/229; G04F 1/00; G04F 1/06; G04F 13/00; G04F 13/06; G07C 1/00; G07C 1/30; G07C 9/00; G07C 9/00007; G09F 3/0291; G09F 3/0292; G09F 3/0295; G09F 3/20; G09F 3/207

USPC ....... 116/200, 206, 207, 216, 217, 218, 219; 368/10, 89, 114, 327; 374/102, 106, 374/E3.004
See application file for complete search history.

(56) References Cited

U.S. PATENT DOCUMENTS

| | | |
|---|---|---|
| 5,822,280 A | 10/1998 | Haas |
| 5,930,206 A | 7/1999 | Haas et al. |
| 6,452,873 B1 | 9/2002 | Holt et al. |
| 6,741,523 B1 * | 5/2004 | Bommarito et al. .... G01K 3/04 116/220 |
| 6,916,116 B2 * | 7/2005 | Diekmann et al. ...... G01K 3/04 116/216 |
| 7,139,226 B2 | 11/2006 | Haas et al. |
| 7,215,604 B2 | 5/2007 | Haas et al. |
| 7,388,814 B2 * | 6/2008 | Teffenhart et al. ....... G04F 1/00 116/200 |
| D709,954 S | 7/2014 | Kasper et al. |
| 9,110,446 B2 | 8/2015 | Kasper et al. |

* cited by examiner

*Primary Examiner* — R. A. Smith
(74) *Attorney, Agent, or Firm* — Husch Blackwell LLP (57) ABSTRACT

A dye-based, multilayer time-indicating label without initial gray time comprises a multilayer first part and a multilayer second part. The first part comprises a topsheet in contact with an enhancement layer and an optional reference layer, and the enhancement layer is in contact with a timing layer. The second part comprises a dye layer, an optional dark layer, and a substrate layer. The timing layer and the dye layer are separate from one another, and are optionally protected by one or more release liners. To activate the indicator, the timing and dye layers are separated from the one or more release liners and then joined to one another.

13 Claims, 5 Drawing Sheets

DYE-BASED TIME INDICATING LABEL
WITHOUT INITIAL GRAY TIME

BACKGROUND OF THE INVENTION

Field of the Invention

This invention relates to time-indicating labels. In one aspect the invention relates to multilayer, dye-based labels while in another aspect, the invention relates to labels comprising a top sheet, an activated opaque (e.g., white) layer, dye and a substrate.

Description of the Related Art

Numerous devices are known which provide, after activation, a visual indication of the passage of a predetermined period of time. Such time indicators are useful, for example, as a security badge, as an indicator of the length of time a perishable item has been on the wholesaler's or retailer's shelf, and for numerous other uses.

U.S. Pat. No. 9,110,446 describes a multilayer time indicator that comprises (A) a top sheet, (B) an activating layer, (C) a timing layer, (D) a dye layer, and (E) a substrate. In one embodiment the top sheet and activating layer comprise a first or activation section of the indicator while the timing layer, dye layer and substrate comprise a second or base section of the indicator. In an inactivate state, the first and second sections are separate from one another and each protected with a release sheet. For activation, the release sheets are removed from each section, and the two sections are joined to one another such that the timing layer of the base section is joined to the activation layer of the activation section.

While these time indicators are effective, they can exhibit initial "grey" time, i.e., they can begin to show color change to the unaided eye upon contact of the activation and timing layers. Ideally, a time indicator would show no color change to the unaided eye until near the end of the time interval for which it was created, and then the color (or image) would rapidly appear. At the very least, however, grey time should not begin at or near the start of the activation of the indicator and in practice, the longer the delay before the start of grey time, the better the indicator.

SUMMARY OF THE INVENTION

In one embodiment the invention is an inactive multilayer time indicator comprising:
(A) A multilayer first part comprising:
  (1) A transparent or translucent first substrate layer having opposing first and second facial surfaces;
  (2) A transparent or translucent enhancement layer having opposing first and second facial layers, the first facial surface of which is in contact with the second facial surface of the substrate layer;
  (3) An opaque timing layer having opposing first and second facial surfaces, the first facial surface of which is in contact with the second facial surface of the enhancement layer; and
(B) A multilayer second part comprising:
  (1) A dye layer comprising a dye and having opposing first and second facial surfaces, and, under ambient conditions, the dye:
    (a) Will not migrate through the dark layer; and
    (b) Will migrate through the timing layer and into the enhancement layer after contact with the timing layer; and
  (2) A dark layer having:
    (a) Opposing first and second facial surfaces, the first facial surface of which is in contact with the second facial surface of the dye layer; and
    (b) An L* value of less than 70; and
  (3) A second substrate layer having opposing first and second facial surfaces, the first facial surface of which is in contact with the second facial surface of the dark layer;
with the proviso that the dye of the second part is not in contact with the timing layer of the first part.

In one embodiment the invention is an inactive multilayer time indicator comprising:
(A) A multilayer first part comprising:
  (1) A transparent or translucent first substrate layer having opposing first and second facial surfaces;
  (2) A transparent or translucent enhancement layer having opposing first and second facial layers, the first facial surface of which is in contact with the second facial surface of the substrate layer;
  (3) An opaque timing layer having opposing first and second facial surfaces, the first facial surface of which is in contact with the second facial surface of the enhancement layer; and
(B) A multilayer second part comprising:
  (1) A dye layer comprising a dye and having opposing first and second facial surfaces, and, under ambient conditions, the dye:
    (a) Will not migrate through the dark layer; and
    (b) Will migrate through the timing layer and into the enhancement layer after contact with the timing layer; and
  (2) A second substrate layer having:
    (a) Opposing first and second facial surfaces, the first facial surface of which is in contact with the second facial surface of the dye layer; and
    (b) An L* value of less than 70;
with the proviso that the dye of the second part is not in contact with the timing layer of the first part.

In one embodiment the invention is an inactive multilayer time indicator comprising:
(A) A transparent or translucent first substrate layer having opposing first and second facial surfaces;
(B) A transparent or translucent enhancement layer having opposing first and second facial layers, the first facial surface of which is in contact with the second facial surface of the substrate layer;
(C) An opaque timing layer having opposing first and second facial surfaces, the first facial surface of which is in contact with the second facial surface of the enhancement layer;
(D) A release liner having opposing first and second facial surfaces, the first facial surface of which is in contact with the second facial surface of the timing layer;
(E) A dye layer having opposing first and second facial surfaces, the first facial surface of which is in contact with the second facial surface of the release liner and, under ambient conditions, the dye:
  (1) Will not migrate through the dark layer; and
  (2) Will migrate through the timing layer and into the enhancement layer after contact with the timing layer;

(F) A dark layer having:
  (1) Opposing first and second facial surfaces, the first facial surface of which is in contact with the dye layer; and
  (2) An L* value of less than 70; and
(G) A second substrate layer having opposing first and second facial surfaces, the first facial surface of which is in contact with the second facial surface of the dark layer;

with the proviso that neither the timing layer nor the dye layer bleeds across the release liner.

In one embodiment the invention is an inactive multilayer time indicator comprising:
(A) A transparent or translucent first substrate layer having opposing first and second facial surfaces;
(B) A transparent or translucent enhancement layer having opposing first and second facial layers, the first facial surface of which is in contact with the second facial surface of the substrate layer;
(C) An opaque timing layer having opposing first and second facial surfaces, the first facial surface of which is in contact with the second facial surface of the enhancement layer; and
(D) A release liner having opposing first and second facial surfaces, the first facial surface of which is in contact with the second facial surface of the timing layer:
(E) A dye layer comprising a dye and having opposing first and second facial surfaces, the first facial surface of which is in contact with the second facial surface of the release liner, and, under ambient conditions, the dye:
  (1) Will not migrate through the dark layer; and
  (2) Will migrate through the timing layer and into the enhancement layer after contact with the timing layer; and
(F) A second substrate layer having:
  (1) Opposing first and second facial surfaces, the first facial surface of which is in contact with the second facial surface of the dye layer; and
  (2) An L* value of less than 70;

with the proviso that neither the timing layer nor the dye layer bleeds across the release liner.

In one embodiment the first substrate layer, enhancement layer and timing layer comprise a first or activation section of the indicator while the dye layer, dark layer and/or second substrate comprise a second or base section of the indicator. In one embodiment the second facial surface of the timing layer is in contact with a release liner. In one embodiment the first facial surface of the dye layer is in contact with a release liner. In one embodiment, the first and second sections of the indicator comprise a kit which can be converted into an active time indicator by removal of the release liners and joining of the base layer to the activation layer. In one embodiment the first and second sections are joined to one another by a common release liner or sheet which maintains the indicator in an inactive state until the release liner is removed and the base layer is joined to the activation layer.

In one embodiment the invention is an activated, multilayer time indicator comprising:
(A) A transparent or translucent first substrate layer having opposing first and second facial surfaces;
(B) A transparent or translucent enhancement layer having opposing first and second facial layers, the first facial surface of which is in contact with the second facial surface of the substrate layer;
(C) An opaque timing layer having opposing first and second facial surfaces, the first facial surface of which is in contact with the second facial surface of the enhancement layer;
(D) A dye layer having opposing first and second facial surfaces, the first facial surface of which is in contact with the second facial surface of the timing layer and, under ambient conditions, the dye:
  (1) Will not migrate through the dark layer; and
  (2) Will migrate through the timing layer and into the enhancement layer after contact with the timing layer;
(E) A dark layer having:
  (1) Opposing first and second facial surfaces, the first facial surface of which is in contact with the migrating dye layer; and
  (2) An L* value of less than 70; and
(F) A second substrate layer having opposing first and second facial surfaces, the first facial surface of which is in contact with the second facial surface of the dark layer.

In one embodiment the invention is an activated, multilayer time indicator comprising:
(A) A transparent or translucent first substrate layer having opposing first and second facial surfaces;
(B) A transparent or translucent enhancement layer having opposing first and second facial layers, the first facial surface of which is in contact with the second facial surface of the substrate layer;
(C) An opaque timing layer having opposing first and second facial surfaces, the first facial surface of which is in contact with the second facial surface of the enhancement layer;
(D) A dye layer having opposing first and second facial surfaces, the first facial surface of which is in contact with the second facial surface of the timing layer and, under ambient conditions, the dye:
  (1) Will not migrate through the dark layer; and
  (2) Will migrate through the timing layer and into the enhancement layer after contact with the timing layer; and
(E) A second substrate layer having:
  (1) Opposing first and second facial surfaces, the first facial surface of which is in contact with the migrating dye layer; and
  (2) An L* value of less than 70.

In one embodiment the first facial surface of the first substrate layer is in contact with a reference material, e.g., an ink. In one embodiment the reference material is of the same color as the dye that is in contact with the first facial surface of the dark layer. In one embodiment the timing layer is white. In one embodiment the dark layer comprises a polymer. In one embodiment the dark layer comprises a pigmented polymer. In one embodiment the dark layer comprises an ink.

BRIEF DESCRIPTION OF THE DRAWINGS

The invention is described generally with reference to the drawings for the purpose of illustrating certain embodiments only, and not for the purpose of limiting the scope of the invention. In the drawings like numerals are used to designate like parts throughout the same.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, layer thickness, is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the label and layer thicknesses.

"Facial surface" and like terms are used in distinction to "edge surface". For example, if rectangular in shape or configuration, a layer, e.g., film, will comprise two opposing facial surfaces joined by four edge surfaces (two opposing pairs of edge surfaces, each pair intersecting the other pair at right angles). If circular in configuration, then the layer will comprise two opposing facial surfaces joined by one continuous edge surface.

"Permeable" and like terms describes a material, e.g., a film, filter, absorbent, scrim, etc., through which a fluid, e.g., a gas, can pass under normal use conditions. "Nonpermeable" and like terms describes a material, e.g., an adhesive, film, etc., through which a fluid cannot pass under normal use conditions.

"Ink" and like terms mean a coatable or printable formulation that can and usually does contain a dye and/or pigment.

"Dye" and like terms mean a light absorbing compound that is present in a molecularly dispersed (dissolved) form.

"Pigment" and like terms mean a visible light reflecting or absorbing material or compound that is present in a non-molecularly dispersed (particulate) form.

"Graphic", "graphic image" and like terms mean text or pictorial representations formed of ink or other dye or pigment substances. Graphics include, but are not limited to, words, numbers, bar codes, pictures, designs (geometric or otherwise), and solid colors (typically applied by flood coating).

"Reflective substance" and like terms mean an electromagenetic energy reflective material or compound that is present in a molecularly dispersed or dissolved form. "Reflective" as used in this definition is a function of opacity as defined in ASTM D2805.

"Appearance" and like terms mean readable by the unaided human eye or by machine.

"Naked eye", "unaided eye" and like terms mean the human eye with or without corrective lenses.

"In contact" and like terms mean that, in the context of adjacent layers of a multilayer part, the opposing facial surfaces of adjacent layers are touching one another, e.g., such as a coating on a substrate.

"aka" means "also known as".

Multilayer First Part

First Substrate Layer

The first substrate layer, or topsheet, of the time indicator of this invention is sufficiently translucent so that a graphic or color beneath it is visible to the naked eye under typical viewing conditions, e.g., daylight or the ambient light available in a typical artificially lit room, such as an office or store. The topsheet can be clear or tinted, and preferably it is transparent. The topsheet can comprise indicia, e.g., a preprinted graphic such as the word "EXPIRED" OR "VOID", that is visible by machine or to the naked eye under typical viewing conditions only after the timing layer has expired.

The topsheet can comprise any polymeric material that is sufficiently translucent that it does not significantly detract from the visibility of the dye. Typically the topsheet is a polymeric film, e.g., a film comprising a polyolefin such as polyethylene or polypropylene, or polyester such as polyethylene terephthalate (PET), or the like. The thickness of the topsheet, also known as an overlay substrate or cover sheet, is a function of a number of different variables including but not limited to the design thickness of the indicator, degree of protection desired for the underlying graphic, cost, and the like, but typically the thickness is from 0.5 to 6 mil (0.0127 to 0.1524 millimeters (mm)), more typically from 1 to 3 mil (0.0254 to 0.0762 mm).

The topsheet comprises first and second facial surfaces with the first facial surface exposed or open to the environment and the second facial surface in contact with a facial surface of the enhancement layer.

In one embodiment the topsheet can be covered with an optional, translucent topcoat which is printable by any convenient manner, e.g. direct thermal, thermal transfer, dot-matrix, inkjet, or handwriting using pens, pencils or markers. Topcoat formulations are commercially available and well known in the art. Examples include 159TT and 334M (both available from Actega Wit) which are a thermal transfer receptive and writable topcoat, respectively. Typically, the formulations are urethane or acrylate based formulations and applied in a thickness range of 2-10 microns.

Enhancement Layer

The enhancement layer, also known as the activation layer, is typically colorless and comprises a plasticizer and an adhesive. The plasticizer, also known as a migrating agent, is compatible, i.e., soluble, with the dye of the dye layer and the resin of the dye layer. Monomeric and polymeric plasticizers can be use, and these plasticizers include but are not limited to PLASTHALL® P-550 (a polyester glutarate), PLASTHALL® 7050 (a dialkyl diether glutarate), PLASTHALL® TOTM (trioctyl trimellitate), and PARAPLEX® G-25 (a polyester sebacate), all available from The HallStar Company.

Any pressure sensitive adhesive that can be solubilized by the selected plasticizer can be used in the enhancement layer, and representative polymer resins include, but are not limited to, polyurethane, polyester, natural or synthetic rubber, rubber-acrylic hybrid, polyethylene-vinyl acetate, acrylic, silicone and the like, with acrylic resins preferred. The weight average molecular weight (Mw) of the resin can vary widely, but it is typically between 5,000 and 1,000,000, and for thermoplastic acrylic resins, typically between 40,000 and 100,000, grams per mole.

The plasticizer is admixed with the resin to lower the glass transition temperature (Tg) of the resin and, in turn, increase the adhesive property of the resin. The plasticizer also facilitates the migration of the dye through the enhancement layer. Typically, the enhancement layer comprises 0, or from greater than 0, to 50, more typically 0, or from greater than 0, to 15, weight percent of the plasticizer. For time-indicating labels with expiration after activation of less than 7 days, typically the enhancement layer comprises a plasticizer (thus speeding the movement of the dye through the enhancement layer). For time-indicating labels with expiration after activation of 7 days or more, typically the enhancement layer does not contain a plasticizer (thus resulting in a slower movement of the dye through the enhancement layer).

In a preferred embodiment, utilizing a pressure sensitive polymer resin, such as AROSET® PS6393 from Ashland, allows for the incorporation of higher loadings of plasticizer to enhance the migration of the dye. Typically, the remainder of the layer comprises the polymer resin and tackifiers although the layer can comprise other components as well, e.g., antioxidants, UV-inhibitors, etc., but these other components are typically used in nominal amounts, e.g., less than 2, more typically less than 1, wt % of the activating layer. Tackifying agents known to the art can be added to increase adhesion to the timing layer surface. Typically, the amount of tackifying agent ranges from 1 to 30 parts based on total solids.

The thickness of the enhancement layer is, like the thickness of the topsheet, a function of a number of different variables including but not limited to the desired timing, design thickness of the indicator, the nature and amount of plasticizer, the nature of the polymer resin, cost and the like, but typically the thickness is from 0.2 to 4 mil (0.00508 to 0.1016 mm), more typically from 1 to 3 mil (0.0254 to 0.0762 mm). The enhancement layer comprises first and second facial surfaces with the first facial surface in contact with the second facial surface of the topsheet and the second facial surface in contact with a facial surface of the timing layer.

Timing Layer

The timing layer comprises a pressure sensitive adhesive, a plasticizer and a pigment. Like the enhancement layer, any pressure sensitive adhesive can be used for the timing layer, and representative polymer resins include, but are not limited to, polyurethane, polyester, natural or synthetic rubber, rubber-acrylic hybrid, polyethylene-vinyl acetate, acrylic, silicone and the like, with acrylic resins preferred. The weight average molecular weight (Mw) of the resin can vary widely, and it is typically between 5,000 and 1,000,000, more typically 40,000 and 100,000, grams per mole for thermoplastic acrylic. The adhesive has a glass transition temperature (Tg) typically less than 25° C., more typically less than 0° C.

The pigment can be any reflective, opaque, or absorptive substance such as aluminum, stainless steel, natural and synthetic mica, coated glasses, metal oxides, silicates, bismuth oxychloride, calcium carbonate, barium sulfate, carbon black but is typically and preferably aluminum flake and/or titanium dioxide ($TiO_2$). Titanium dioxide is a preferred pigment because its high whiteness and opacity reduces the visibility of the dye as it migrates through the timing layer, delaying and minimizing the grey time or, in other words, the time that exists between the start of color development to the completion of the color development (both as observed by a machine or the unaided eye). For example, a preferred, film-forming timing layer that is constructed using $TiO_2$ has opacity of at least 82% per ASTM D2805.

The thickness of the timing layer is, like the thickness of the topsheet and enhancement layer, a function of a number of different variables including but not limited to the desired timing, design thickness of the time indicator, the nature and amount of pigment, the nature of the polymer resin in the adhesive, cost and the like, but typically from 0.2 to 4 mil (0.00508 to 0.1016 mm), more typically from 1 to 3 mil (0.0254 to 0.0762 mm). The timing layer comprises first and second facial surfaces with the first facial surface in contact with the second facial surface of the enhancement layer. The second facial surface of the timing layer is in contact with, depending upon the state of the time indicator, either a protective or release layer, open to the environment, or in contact with the facial surface of the dye layer.

The timing layer can comprise indicia, e.g., a preprinted graphic such as the word "EXPIRED" or "VOID", that is visible by machine or to the naked eye under typical viewing conditions only after the timing layer has expired.

Topsheet, Enhancement and Timing Layers

The combination of the topsheet, enhancement and timing layers comprises the first part or section of the time indicator. This first section is typically manufactured separate from the second section of the time indicator, and it typically comprises an optional release layer to protect the timing layer during manufacturing, packaging, storage and/or shipping. The topsheet, enhancement and timing layers can be joined to one another in any convenient manner with or without the use of an adhesive. Typically, one layer is joined to an adjacent layer without the use of an adhesive using any one of a number of known coating processes. In one embodiment, the timing layer is applied to the enhancement layer by means of heat lamination and without the use of an adhesive. The proper selection of processing controls such as lamination temperature, roller speed and pressure are well within the knowledge of those skilled in the art. When the time indicator is to be activated, the optional release layer in contact with the second facial surface of the timing layer is removed so that the second facial surface of the timing layer can be brought into contact with the first facial surface of the dye layer. Exemplary release layers include, but are not limited to, polyvinyl alcohol, silicones, fluorinated chemicals, glassine paper and waxes.

Multilayer Second Part

Dye Layer

The dye layer comprises a polymer resin and an organic solvent soluble dye. Like the enhancement and timing layers, any film-forming polymer resin can be used for the dye layer, and representative polymer resins include, but are not limited to, acrylic, polyurethane, polyester, polyvinyl chloride, rubber, rubber-acrylic hybrid and the like, with acrylic and polyester resins preferred. The weight average molecular weight (Mw) of the resin can vary widely, and it is typically between 5,000 and 1,000,000, more typically between 10,000 and 40,000, grams per mole for thermoplastic polyester. The resin has a Tg typically greater than 25° C., more typically greater than 50° C. which maximizes the storage stability of the final construction, with the preferred Tg range determined in large part by the chemical composition of the film substrate. An alternative method would be to solubilize the dye in a pressure sensitive adhesive.

The dye component of the dye layer is water-insoluble and soluble in organic solvents such as nonpolar solvents such as various aromatic and aliphatic hydrocarbons like toluene, xylene, pentane, etc., and various polar solvents such as ketones, acetates, ethers, esters, alcohols, etc. The dye is also soluble in the resin and plasticizer of the enhancement layer. A wide variety of dyes can be used in the practice of this invention including diazo dyes, carbonyl dyes, polymethine dyes, azomethine dyes, triarylmethane dyes, indoaniline dyes, indophenol dyes, xanthine dyes, oxazine dyes, and thiazine dyes although the dyes of the anthraquinone, methine and azo dye families are preferred. The dyes are typically used at a concentration of 1-30 parts, preferably 10-25 parts solids in the dye layer. The thickness of the dye layer is, like the thickness of the topsheet, enhancement and timing layers, a function of a number of different variables including but not limited to the design thickness of the time indicator, the nature and amount of pigment, the nature of the polymer resin, cost and the like, but typically the thickness is from 0.001 to 1 mil (0.0000254 to 0.0254 mm), more typically from 0.05 to 0.2 mil (0.00127 to 0.00508 mm). Solubilizing the dye in an organic solvent makes it more uniformly available to the solubilizing action of the plasticizer than if it was in a particulate or dispersed form, such as solvent soluble dye particulates dispersed in a water-based coating.

The dye layer can comprise indicia, e.g., a preprinted graphic such as the word "EXPIRED" or "VOID", that is visible by machine or to the naked eye under typical viewing conditions only after the timing layer has expired.

Dark Layer

The dark layer minimizes or deprives the time indicator of sufficient contrast to allow the naked eye to discern the onset and early development of grey time. The dark layer can comprise any material that exhibits an L* value of 85 or less, or 70 or less, or 60 or less, or 50 or less, or 40 or less, or 30 or less, or 20 or less, or 10 or less. L* represents lightness in L*a*b* color space, and the darkest black is L*=0, and the brightest white is L*=100. L* is measured with an X-Rite 530 Series Spectrodensitometer using an observation angle at 2°, D65 illumination, and L*a*b* color space. The instrument aperture is placed over the dark area of the back part for measurement.

Typically the dark layer comprises a polymer, more typically a pigmented polymer, or an ink. The dark layer may be composed of acrylic, polyurethane, polyester, polyvinyl chloride, polystyrene, polyamide, chlorinated polyethylene, chlorinated polypropylene, hydrocarbon resins, polyvinyl alcohol, cellulosic resins, phenoxy resins, natural or synthetic rubber, or polyvinyl acetate polymer. Additionally, the dark layer may contain inorganic or organic pigments/dyes such as carbon black, barium sulfate, titanium dioxide, zinc oxide, bone black, quinacridones, phalocyanines, perylenes, pyrroles, arylamides, azo compounds, diarylide compounds, aluminum flake pigment, pearlescent pigments, anthoxamthins, alizarins, perinones, iron oxide, and the like.

Second Substrate Layer

The second substrate, or base, layer of the time-indicator can be any substrate, typically a film or paper, whose structural integrity is not compromised or otherwise affected by the plasticizer. Exemplary substrate layers include, but are not limited to, various polymeric films such as polyesters, polyimides, polyolefins, polycarbonates, various non-polymeric materials such as glassine or wax paper, woven and non-woven papers or fabrics, and metal foils. In one embodiment, the preferred substrate is a solvent resistant polymeric film that will provide a uniform, smooth surface for the dye and timing layers which will improve the consistency and accuracy of dye migration after activation.

Dye Layer, Dark Layer and Second Substrate Layer

The dye layer needs to adhere to the dark layer, and it is typically applied to the dark layer using a printing or coating technique, e.g., flexographic, gravure, screen, Meyer rod or the like. Typically, the polymer resin chemistry of the dye and dark layers is the same which provides good adhesion and minimizes the interface between the two layers. While the dye layer adheres well to the surface of the dark layer, the composition of the dark layer is such that the dye of the dye layer does not bleed through the dark layer onto the second substrate layer.

Similar to the timing layer, the dye layer can be protected by an optional release liner until the second section of the time indicator is ready to be joined to the first section of the time indicator. In certain constructions of the time indicator, the first and second sections are joined together by a common release liner separating the timing and dye layers. When ready for use, the two sections are separated from the common release liner, and then joined together, typically by pressing the open surface of the dye layer against the open surface of the timing layer to form an activated time indicator.

SPECIFIC EMBODIMENTS

Figure 1A:
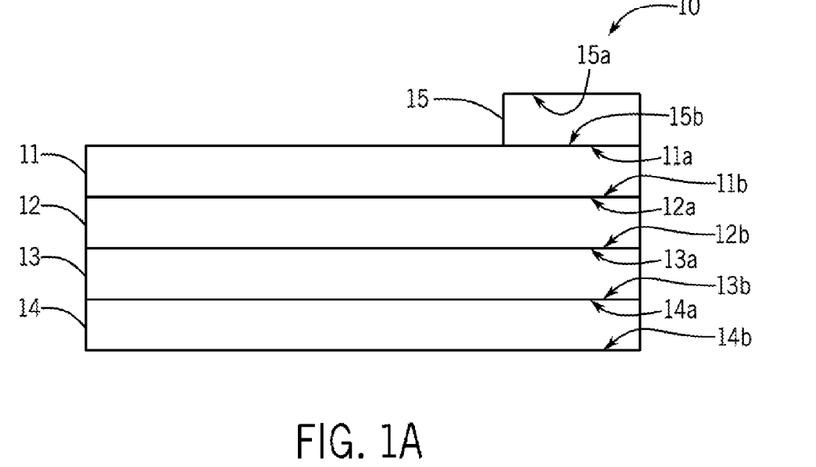
FIG. 1A is a schematic representation of a multilayer first part of one embodiment of a time indicator of this invention.

FIG. 1A is a schematic representation of a multilayer first part of one embodiment of a time indicator of this invention. First part 10 (also known as (aka) an activation part or section, or front part, or top part) comprises transparent or translucent first substrate layer (also known as a "topsheet") 11 and transparent or translucent enhancement layer 12. Topsheet 11 comprises first and second facial surfaces 11a and 11b, and enhancement layer 12 comprises first and second facial surfaces 12a and 12b, with second facial surface 11b of topsheet 11 in contact with first facial surface 12a of activating layer 12. Multilayer first part 10 further comprises timing layer 13 which comprises first and second facial surfaces 13a and 13b, with second facial surface 12b of enhancement layer 12 in contact with first facial surface 13a of timing layer 13. In one embodiment multilayer first part 10 further comprises optional release sheet or layer 14 which comprises facial surfaces 14a and 14b in which facial surface 14a is in contact with facial surface 13b of timing layer 13. The purpose, of course, of optional release sheet 14 is to protect timing layer 13 until it is ready to be joined to the dye layer of the multilayer second part to activate the time indicator.

In one embodiment the multilayer first part further comprises optional reference material 15 which comprises first and second facial surfaces 15a and 15b with second facial surface 15b in contact with a portion of facial surface 11a of topsheet 11. Optional reference material 15 is typically of the same color as the dye in the dye layer of the multilayer second part, and it typically comprises the same dye as the dye in the dye layer of the multilayer second part. The optional reference material typically is in contact with just a small, e.g., less than 25, or 20, or 15, or 10, or 5, percent of the total area of first facial surface 11a, and its purpose is to provide a ready indication to an observer that the time indicator (e.g., badge, label, etc.) has expired, i.e., sufficient dye has migrated through the timing and enhancement layers so that its color matches that of the reference material.

Figure 1B:
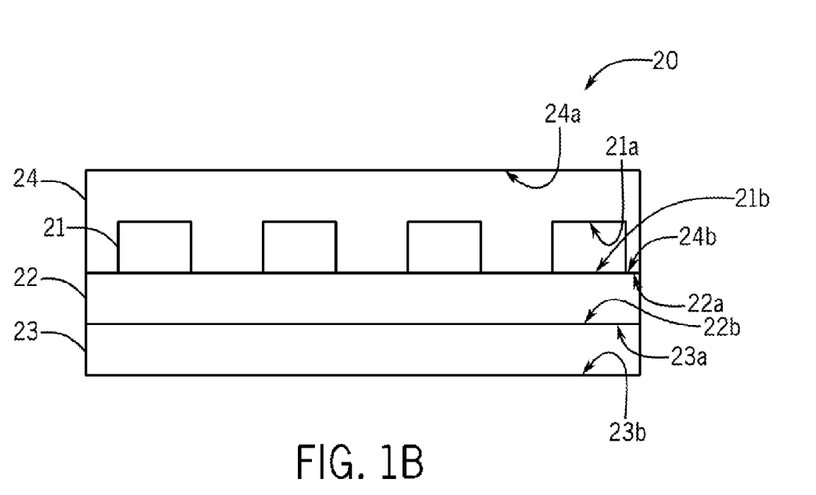
FIG. 1B is a schematic representation of a multilayer second part of one embodiment of a time indicator of this invention with a dark layer.

FIG. 1B is a schematic representation of a multilayer second part of one embodiment of a time indicator of this invention. Multilayer second part 20 (aka a "base layer", or back part, or bottom part) comprises dye layer 21, dark layer 22 and second substrate 23. Dye layer 21 comprises first and second facial surfaces 21a and 21b, dark layer 22 comprises first and second facial surfaces 22a and 22b, and substrate 23 comprises first and second facial surfaces 23a and 23b. Second facial surface 21b of dye layer 21 is in contact with first facial surface 22a of dark layer 22, and second facial surface 22b of dark layer 22 is in contact with first facial surface 23a of second substrate 23. In one embodiment, second section 20 further comprises optional release sheet or layer 24 which comprises first and second facial surfaces 24a and 24b in which second facial surface 24b is in contact with first facial surface 21a of dye layer 21. If the dye of dye layer 21 is in the configuration of a graphic, then second facial surface 24b of release sheet 24 will likely in contact with both first facial surface 21a of dye layer 21 and first facial surface 22a of dark layer 22. The purpose of optional release sheet 24 is like that for release sheet 14, i.e., to protect dye layer 21, and, for that matter, underlying dark layer 22 to the extent that it is covered, i.e., not in contact with, dye layer 21, until it is ready to be joined to the timing layer to activate the time indicator.

Dye layer 21 can cover the entire first facial surface of the dark layer, or only some limited part of the first facial surface of the dark layer. If the latter, then the second facial surface of the dye layer typically is in contact with the first facial surface of the dark layer so as to form an image or graphic that conveys certain information, e.g., the word "VOID" or "EXPIRED".

Figure 1C:
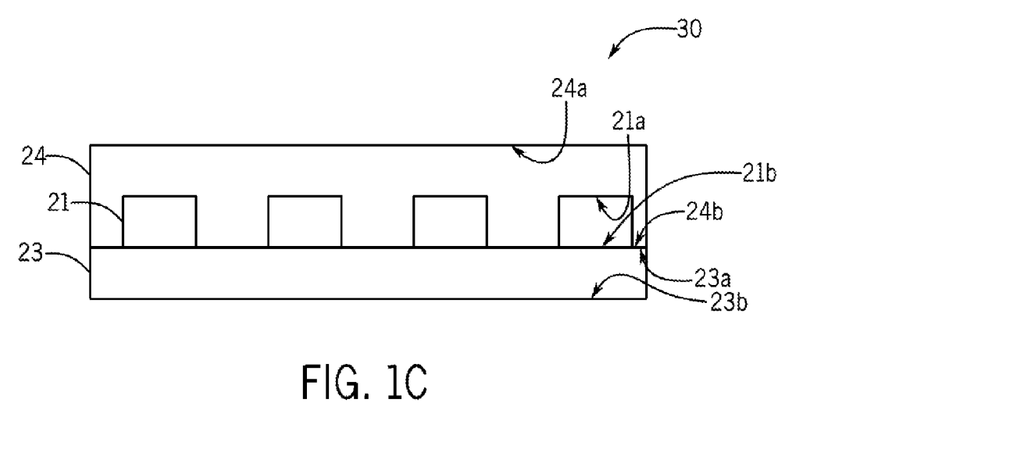
FIG. 1C is a schematic representation of a multilayer second part of one embodiment of a time indicator of this invention without a dark layer.

FIG. 1C is a schematic representation of an alternate construction of the multilayer second part of a time indicator of this invention. In this embodiment, multilayer second part 30 omits dark layer 22 (as shown in FIG. 1B) from the construction and as such, second facial surface 21b of dye layer 21 is in contact with first facial surface 23a of second substrate 23. In this embodiment, second substrate 23 has an L* value of 85 or less, or 70 or less, or 60 or less, etc., such that second substrate 23 serves the purpose of dark layer 22, i.e., it delays the observance of the onset of grey time by masking the color change in the timing and enhancement layers as the dye migrates through and into them.

Figure 1D:
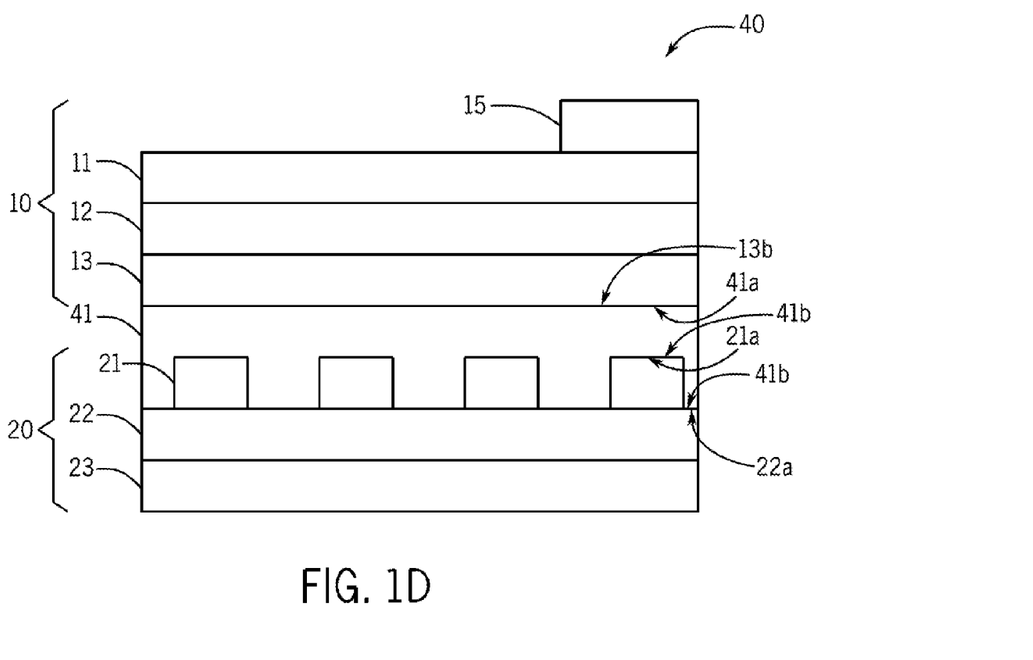
FIG. 1D is a schematic representation of one embodiment of a time indicator in which (i) the first and second sections are joined to one another at a common release liner, (ii) a dark layer is present, and (iii) the time indicator is not activated.

FIG. 1D is a first schematic representation of one embodiment of a time indicator in which the multilayer first and second parts are joined to one another but the time indicator is not activated. In this embodiment time indicator 40 comprises first section 10 joined to second section 20 by release sheet 41 which comprises first facial surface 41a and second facial surface 41b. First facial surface 41a of release sheet 41 is in contact with second facial surface 13b of timing layer 13 while second facial surface 41b is in contact with first facial surface 21a of dye layer 21 and first facial surface 22a of dark layer 22. Release sheet 41 is constructed from materials of any typical release sheet, e.g., polymeric film, glassine paper, etc., that not only protects the integrity of both the timing and dye layers, but also does not allow a component to bleed from one layer to the other layer and thus initiate a pre-mature activation of the time indicator.

Figure 1E:
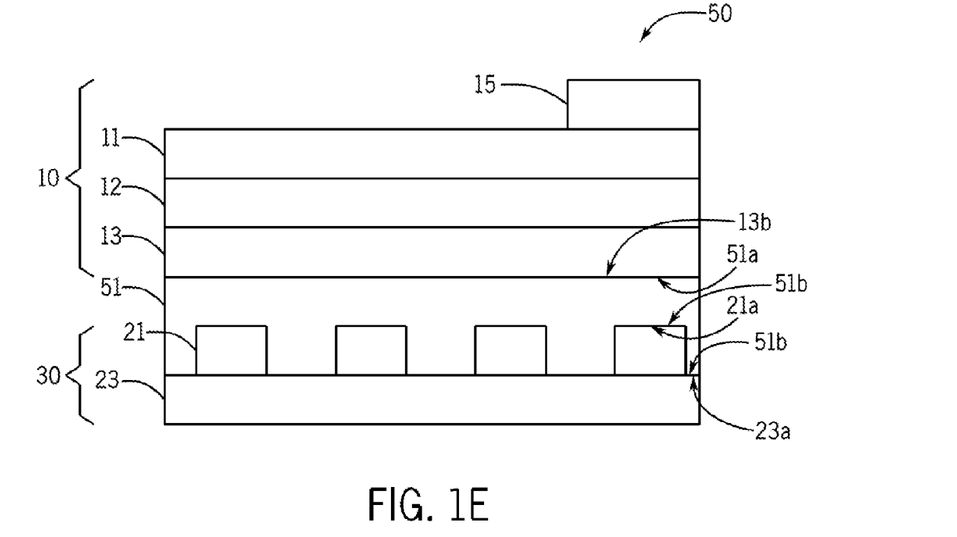
FIG. 1E is a schematic representation of one embodiment of a time indicator in which (i) the first and second sections are joined to one another at a common release liner, (ii) a dark layer is not present, and (iii) the time indicator is not activated.

FIG. 1E is a second schematic representation of one embodiment of a time indicator in which the multilayer first and second parts are joined to one another but the time indicator is not activated. In this embodiment time indicator 50 comprises first section 10 joined to second section 30 by release sheet 51 which comprises first facial surface 51a and second facial surface 51b. First facial surface 51a of release sheet 51 is in contact with second facial surface 13b of timing layer 13 while second facial surface 51b is in contact with first facial surface 21a of dye layer 21 and first facial surface 23a of second substrate 23. Release sheet 51 is constructed in the same manner as release sheet 41.

Figure 1F:
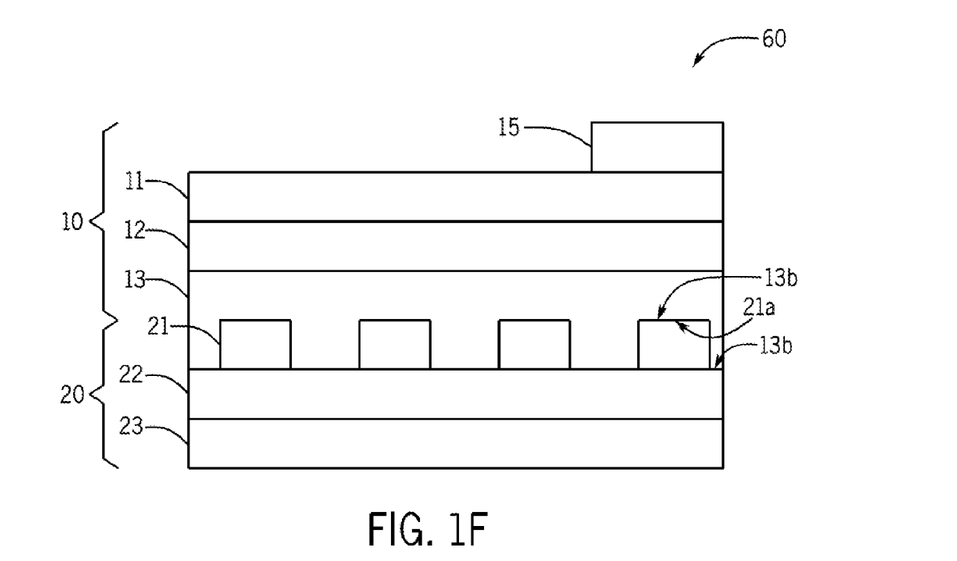
FIG. 1F is a schematic representation of one embodiment of an activated time indicator comprising a dark layer.

FIG. 1F is a first schematic representation of one embodiment of an activated time indicator. Activated time indicator 60 comprises first section 10 joined to second section 20 at the interface of timing layer 13 and dye layer 21, i.e., at the interface formed by the contact of second facial surface 13b of activating layer 13 and first facial surface 21a of timing layer 21. In the embodiments in which ink layer 21 does not cover completely first facial surface 22a of dark layer 22, e.g., ink layer 21 is in the form of a graphic such as a word or symbol, then second facial surface 13b of timing layer 13 is in contact with those areas of first facial surface 22a of dark layer 22 not covered by ink layer 21. The embodiment of FIG. 1F is essentially the embodiment of FIG. 1D without release sheet 41 separating the first and second sections of the time indicator.

Figures 1G, 1H:
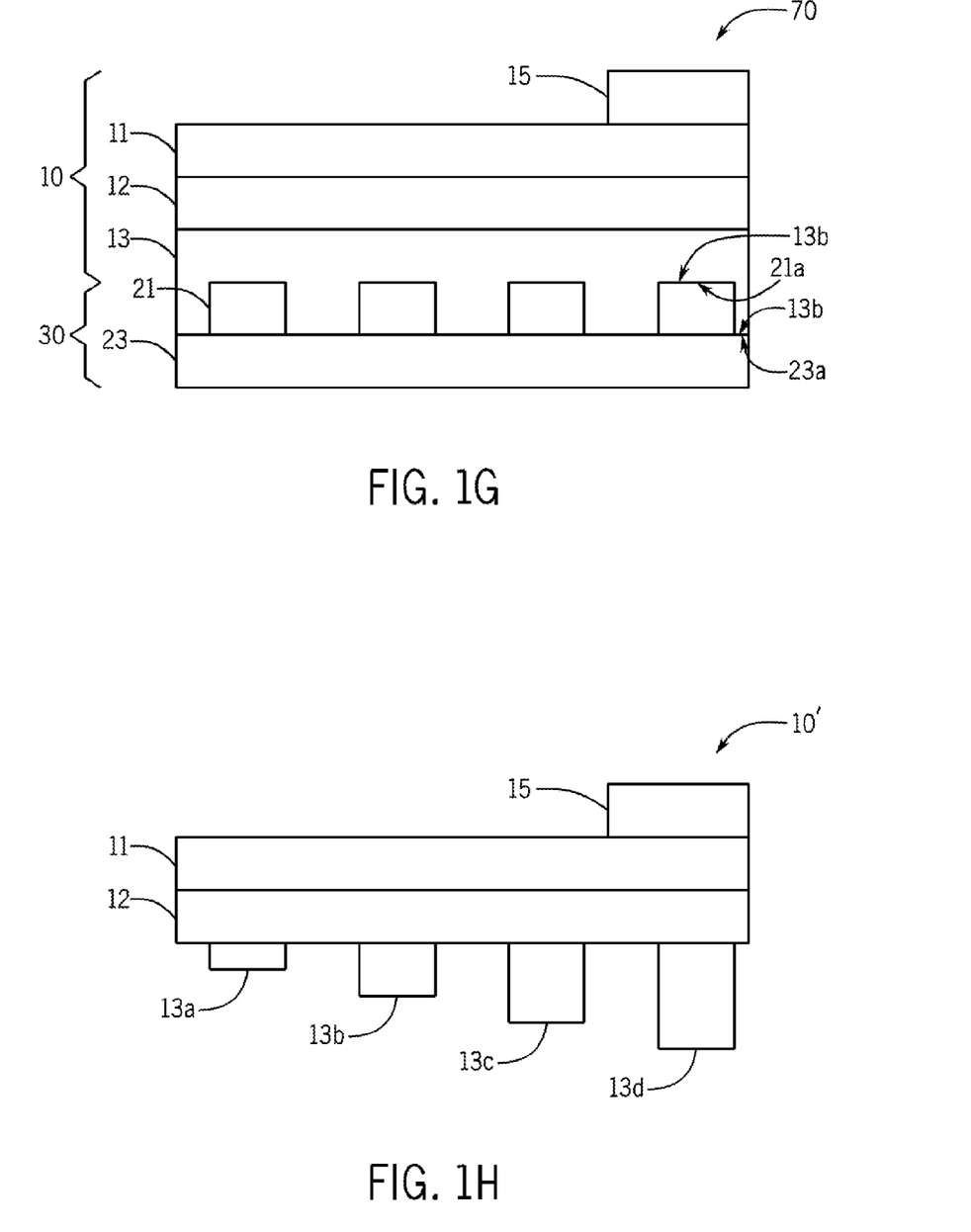
FIG. 1G is a schematic representation of one embodiment of an activated time indicator without a dark layer.
FIG. 1H is a schematic of the first part of one embodiment of a time indicator of this invention coated with multiple timing layers.

FIG. 1G is a second schematic representation of one embodiment of an activated time indicator. Activated time indicator 70 comprises first section 10 joined to second section 30 at the interface of timing layer 13 and dye layer 21, i.e., at the interface formed by the contact of second facial surface 13b of activating layer 13 and first facial surface 21a of timing layer 21. In the embodiments in which ink layer 21 does not cover completely first facial surface 23a of second substrate 23, e.g., ink layer 21 is in the form of a graphic such as a word or symbol, then second facial surface 13b of timing layer 13 is in contact with those areas of first facial surface 23a of second substrate 23 not covered by ink layer 21. The embodiment of FIG. 1G is essentially the embodiment of FIG. 1E without release sheet 51 separating the first and second sections of the time indicator.

FIG. 1H is a schematic of an alternative second section of one embodiment of a time indicator of this invention in which multiple dye layers are coated onto a dark layer. Second section 20' (aka a base layer) contains multiple dye layers 21a, 21b, 21c and 21d that are applied to dark layer 22. The embodiment of FIG. 1H is essentially the embodiment of FIG. 1B with multiple dye layers 21a, 21b, 21c and 21d applied to the surface of the dark layer 22. Dye layers 21a, 21b, 21c and 21d are different thicknesses. These multiple dye layers allow for multiple indication zones to be located on a single time indicating construction.

Activation of the time indicator is essentially the joining of the first and second sections. In the embodiment in which each section is manufactured as a separate piece with an optional, protective release sheet or liner such as described in FIGS. 1A-C, the release sheet is simply removed from both sections, e.g., typically by peeling it off the layer to which it is adhered, discarding the removed release liners in an environmentally acceptable manner, and then joining the first and second sections to one another, e.g., simply by laminating the activating layer to the timing layer. The dye will move into and through the timing layer to the enhancement layer in which it will become visible. Alternatively, release sheet 41 or 51 is removed from time indicator 40 or 50, and sections 10 and 20, or 10 and 30, are then joined to one another to activate the time indicator.

EXAMPLES

Inventive Example 1

Figure 2A:
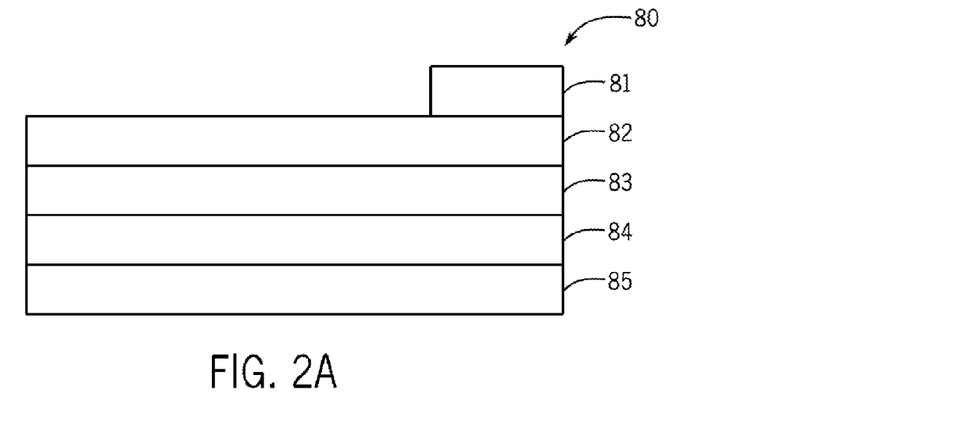
FIG. 2A illustrates a first part (aka, a front or top part) of a multilayer time indicating badge of this invention.
Figure 2B:
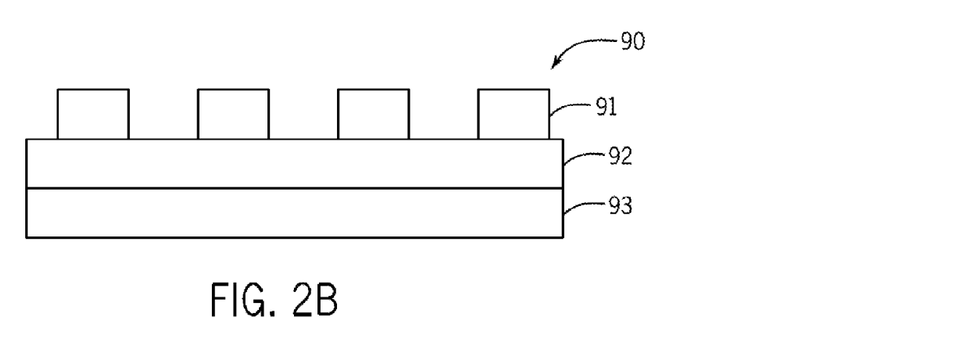
FIG. 2B illustrates a second part (aka, a back or bottom part) of a multilayer time indicator of this invention.

FIG. 2A illustrates a first part (aka, a front or top part) of a multilayer time indicating badge of this invention. First part 80 comprises reference area 81 in contact with first substrate layer 82, which is in contact with enhancement layer 83, which is in contact with timing layer 84, which is in contact with protective liner 85. FIG. 2B illustrates a second part (aka, a back or bottom part) of a multilayer time indicator of this invention. Second part 90 comprises dye layer 91 which is in contact with dark layer 92, which is in contact with second substrate layer 93.

First substrate layer 82 comprised Kanzaki KPL-2370 Direct Thermal Film. Enhancement layer 83 comprised AROSET® PS6393 adhesive and PLASTHALL® 7050 plasticizer (92.5% AROSET® PS6393, 7.5% PLASTHALL® 7050). Timing layer 84 comprised AROSET® PS6393 adhesive, titanium dioxide, and PLASTHALL® 7050 plasticizer (52.5% AROSET® PS 6393, 7.5% PLASTHALL® 7050, and 40% TINT-AYD ST 8003 titanium dioxide dispersion). Protective liner 85 was BR-170 glassine paper.

Dye layer 91 comprised Interactive Inks and Coating Company Red 100 ink (product ID: DIRE 14-11001 STD, Batch #162397-11). Reference area 81 comprised the same ink as dye layer 91. Dark layer 92 comprised Actega WIT ACTExact™ REL401372 process black (a UV-curable black ink). Second substrate 93 comprised Verso Paper Product Litho C1S Paper.

First part 80 and Second part 90 were prepared using the protocol and equipment described below. The time indicating badge is activated by removing protective liner 85 from timing layer 84 of first part 80, and then joining the first part 80 to second part 90 such that exposed timing layer 84 is in contact with dye layer 91. The results of this example are reported in Tables 1-3.

Inventive Example 2

This example is the same in all aspects with that of Inventive Example 1 except that dark layer 92 comprises Actega WIT VERSIFILM™ Plus Jet Blank Ink WFL 043195 (a water-based black ink). The results of this example are also reported in Tables 1-3.

Comparative Example 1

Figure 2C:
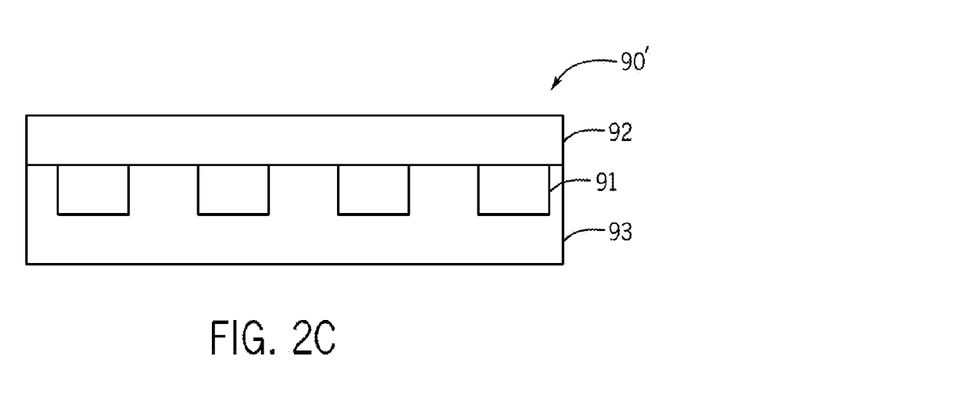
FIG. 2C illustrates a second part (aka, a back or bottom part) of a comparative multilayer time indicator.

This example is the same in all aspects with that of Inventive Example 2 except that the positioning of the dye layer and the dark layer in the second part are reversed. This is illustrated in FIG. 2C. Second part 90' comprises dark layer 92 over and in contact with dye layer 91 which is over and in contact with second substrate layer 93. In this arrangement the activation of the time indicating badge is initiated by joining the first part 80 to second part 90' such that exposed timing layer 84 is in contact with dark layer 92. The results of this example are reported in Tables 1-3.

Comparative Example 2

This example is the same in all aspects with that of Comparative Example 1 except that dark layer 92 comprises Actega WIT VERSIFILM™ Plus Jet Blank Ink WFL 043195. The results of this example are also reported in Tables 1-3.

Materials, Equipment and Protocol

The following is a description of the materials, equipment and protocol used to perform Inventive Examples 1-2 and Comparative Examples 1-2.

1. Face stock
   a. Verso Paper Product Litho
      i. Y2984406
      ii. BRM2507
      iii. C1S paper
2. Inks
   a. Actega WIT Versifilm ™ Plus Jet Black Ink
      i. Y1819119
      ii. Product ID: WFL043195, Batch# 2015184055
      iii. Anilox roll: 300 LPI, 10.0 BCM
   b. Interactive Inks and Coating Company Red 100 ink
      i. Y1819207
      ii. Product ID: DIRE14-11001 STD, Batch# 162397-11
      iii. Anilox roll: 300 LPI, 8.0 BCM
   c. Actega WIT ACTExact ™ UV Curable Black Ink
      i. Product ID: REL401372 process black
      ii. Anilox roll: 300 LPI, 8.0 BCM
3. Magnetic Die
   a. Wilson Manufacturing tool # FC 79726 back part
4. Face stock
   a. Kanzaki KPL2370 direct thermal BOPP
      i. BRM-2077
      ii. Y4068950, Batch# 404304-A
   b. 1 day Formulations Option #1
      1. Enhancement adhesive
         a. Lean NPD Press Speed: 2 fpm
         b. Oven Temperature:
            i. Zone 1 = 300° F.
            ii. Zone 2 = 300° F.

c. Knife over roll: 4 mil gap
      i. Start of Run
         1. Operator = 13.4 lb/rm
         2. Gear = 13.2 lb/rm
      ii. End of Run
         1. Operator = 13.5 lb/rm
         2. Gear = 13.5 lb/rm
   d. Corona Treatment for DT facestock:
      i. 700 W-min/m² offline @ 66 fpm
   e. Coat to the BR-170 liner and laminate to the BRM-2077 DT face stock
2. White timing adhesive
   a. Lean NPD Press Speed: 2 fpm
   b. Oven Temperature:
      i. Zone 1 = 270° F.
      ii. Zone 2 = 280° F.
   c. Knife over roll: 7 mil gap
      i. Start of Run
         1. Operator = 39.2 lb/rm
         2. Gear = 39.6 lb/rm
      ii. End of Run
         1. Operator = 40.0 lb/rm
         2. Gear = 39.7 lb/rm
   d. Coat to the BR-170 liner and laminate to the enhancement layer adhesive side
5. NPD Flexo Press Trial
   Speed: 50 fpm
   Die # 10D41106104
   a. Station #1
      i. Siegwerk L39M5XX4U4GQ UV Primer
         a. Batch# 0B47H-001
      2. Anilox roll: 800 LPI, 1.8 BCM
      3. Printing Plate: T93802, BC Visitor.eps
      4. UV output: 50%
   b. Station #2
      i. Siegwerk L39D5UM1B3VA FL 39-5 10 HR PINK SFR
         a. Batch# 0B31Z-001
      2. Anilox roll: 400 LPI, 3.8 BCM
      3. Printing Plate: T93802, BC Visitor.eps
      4. UV output: 50%
      5. X-Rite Color Measurement (D65/2)

Results and Discussion

Tables 1-3 report the color development results of the test badges of Inventive Examples (IE) 1 and 2 and Comparative Examples (CE) 1 and 2. A discussion of the results follows Table 3.

TABLE 1

Cover Development of IE 1-2 and CE 1-2 Over Hours 0-1

| | | Time, hrs | | | | | | | |
|---|---|---|---|---|---|---|---|---|---|
| | | 0 | | | | 1 | | | |
| | | Color Value | | | | | | | |
| | | L* | a* | b | ΔE | L* | a* | b | ΔE |
| IE-1 | No dye | 92.73 | −0.98 | 0.36 | | 92.65 | −1.02 | 0.38 | |
| | area | 92.74 | −1 | 0.33 | | 92.53 | −1.02 | 0.41 | |
| | Average | 92.74 | −0.99 | 0.35 | 0 | 92.59 | −1.02 | 0.4 | 0.16 |
| | Dye | 92.84 | −0.8 | 0.42 | | 92.56 | −1.02 | 0.4 | |
| | area | 92.7 | −0.78 | 0.33 | | 92.28 | 0.06 | 0.31 | |
| | Average | 92.77 | −0.79 | 0.38 | 0.21 | 92.42 | −0.48 | 0.36 | 0.6 |
| CE-2 | No dye | 92.89 | −1 | 0.43 | | 92.82 | −1.03 | 0.5 | |
| | area | 92.82 | −0.99 | 0.42 | | 92.67 | −1.02 | 0.48 | |
| | Average | 92.86 | −1 | 0.43 | 0 | 92.75 | −1.03 | 0.49 | 0.13 |
| | Dye | 92.88 | −0.99 | 0.41 | | 92.36 | −0.98 | 0.36 | |
| | area | 92.75 | −0.98 | 0.39 | | 92.74 | −1 | 0.46 | |
| | Average | 92.82 | −0.99 | 0.4 | 0.05 | 92.55 | −0.99 | 0.41 | 0.31 |
| IE-2 | No dye | 92.76 | −1.02 | 0.44 | | 92.83 | −1.03 | 0.55 | |
| | area | 92.74 | −0.99 | 0.39 | | | | | |
| | Average | 92.75 | −1.01 | 0.42 | 0 | 92.78 | −1.03 | 0.50 | 0.09 |
| | Dye | 92.68 | −0.8 | 0.31 | | 92.18 | 0.15 | 0.23 | |
| | area | 92.66 | −0.76 | 0.33 | | 92.17 | 0.29 | 0.21 | |
| | Average | 92.67 | −0.78 | 0.32 | 0.26 | 92.18 | 0.22 | 0.22 | 1.37 |
| CE-1 | No dye | 92.73 | −0.96 | 0.42 | | 92.65 | −0.98 | 0.49 | 0.12 |
| | area | 92.69 | −1.01 | 0.40 | | 92.7 | −1.05 | 0.56 | |
| | Average | 92.71 | −0.99 | 0.41 | 0 | 92.68 | −1.02 | 0.53 | 0.12 |
| | Dye | 92.85 | −0.90 | 0.41 | | 92.4 | −0.39 | 0.33 | |
| | area | 92.93 | −0.96 | 0.44 | | 92.56 | −0.42 | 0.39 | |
| | Average | 92.89 | −0.93 | 0.43 | 0.19 | 92.48 | −0.41 | 0.36 | 0.63 |
| Time, hrs | | 0 | | | | 1 | | | |

TABLE 2

Color Development of IE 1-2 and CE 1-2 Over Hours 1 to 5

| | | Time, hrs | | | | | | | | | | | | | |
|---|---|---|---|---|---|---|---|---|---|---|---|---|---|---|---|
| | | 2.25 | | | | 4 | | | | 5 | | | | | |
| | | Color Value | | | | | | | | | | | | | |
| | | L* | a* | b | ΔE | a* | b | ΔE | L* | a* | b | ΔE | L* | a* | b | ΔE |
| IE-1 | No dye | 92.58 | −1 | 0.35 | | −0.98 | 0.41 | | 92.41 | −0.98 | 0.41 | | 92.3 | −0.96 | 0.39 | |
| | area | 92.29 | −1.03 | 0.39 | | −1.01 | 0.43 | | 92.3 | −1.03 | 0.39 | | 92.14 | −1.01 | 0.39 | |
| | Average | 92.44 | −1.02 | 0.37 | 0.3 | −1.00 | 0.42 | 0.32 | 92.36 | −1.01 | 0.40 | 0.38 | 92.22 | −0.99 | 0.39 | 0.52 |
| | Dye area | 92.36 | −1.02 | 0.38 | | 3.62 | −0.26 | | 90.06 | 5.12 | −0.55 | | 89.18 | 7.05 | −0.87 | |
| | | 91.45 | 1.71 | −0.01 | | 4.07 | −0.4 | | 89.88 | 5.18 | −0.57 | | 88.68 | 7.81 | −1 | |
| | Average | 91.91 | 0.34 | 0.19 | 1.58 | 3.85 | −0.33 | 5.32 | 89.97 | 5.15 | −0.56 | 6.79 | 88.93 | 7.43 | −0.94 | 9.33 |
| CE-2 | No dye | 92.52 | −1.02 | 0.61 | | −1.02 | 0.66 | | 92.65 | −1.04 | | | 92.71 | −1.02 | 0.61 | |
| | area | 92.61 | −1.03 | 0.47 | | −1.01 | 0.53 | | 92.62 | −1.05 | 0.51 | | 92.69 | −1.04 | 0.5 | |
| | Average | 92.57 | −1.03 | 0.54 | 0.31 | −1.02 | 0.60 | 0.26 | 92.64 | −1.05 | 0.58 | 0.27 | 92.70 | −1.03 | 0.56 | 0.21 |
| | Dye area | 92.72 | −0.93 | 0.48 | | −0.86 | 0.52 | | 92.57 | −0.87 | 0.49 | 92.56 | −0.68 | 0.44 | 0.48 |
| | | 92.67 | −0.92 | 0.56 | | −0.95 | 0.51 | | 92.53 | −0.79 | 0.51 | | 92.49 | −0.71 | 0.52 | |
| | Average | 92.7 | −0.93 | 0.52 | 0.2 | −0.91 | 0.52 | 0.28 | 92.55 | −0.83 | 0.50 | 0.35 | 92.53 | −0.70 | 0.48 | 0.45 |
| IE-2 | No dye | 92.65 | −1.02 | 0.55 | | −1.06 | 0.54 | | 92.8 | −1.03 | 0.57 | | 92.75 | −1.01 | 0.53 | |
| | area | | | | | −0.97 | 0.48 | | 92.55 | −1.01 | 0.45 | | 92.55 | −1.02 | 0.46 | |

TABLE 2-continued

Color Development of IE 1-2 and CE 1-2 Over Hours 1 to 5

| | | Time, hrs | | | | | | | | | | | | | |
|---|---|---|---|---|---|---|---|---|---|---|---|---|---|---|---|
| | | 2.25 | | | | 4 | | | | | 5 | | | | |
| | | | | | | Color Value | | | | | | | | | |
| | | L* | a* | b | ΔE | a* | b | ΔE | L* | a* | b | ΔE | L* | a* | b | ΔE |
| | Average | 92.62 | −1.02 | 0.52 | 0.17 | −1.02 | 0.51 | 0.12 | 92.68 | −1.02 | 0.51 | 0.12 | 92.65 | −1.02 | 0.50 | 0.13 |
| | Dye area | 91.28 | 1.97 | −0.09 | | 4.35 | −0.42 | | 89.63 | 5.8 | −0.68 | | 8.64 | −1.14 | 0.52 | |
| | | 91.09 | 2.15 | −0.14 | | 4.37 | −0.41 | | 89.91 | 5.19 | −0.54 | | 88.35 | 8.7 | −1.18 | |
| | Average | 91.19 | 2.06 | −0.12 | 3.48 | 4.36 | −0.42 | 5.96 | 89.77 | 5.50 | −0.61 | 7.22 | 88.38 | 8.67 | −1.16 | 10.73 |
| CE-1 | No dye | 92.67 | −0.99 | 0.57 | | −0.99 | 0.69 | | 92.73 | −1 | 0.63 | | 92.67 | −1 | 0.56 | |
| | area | 92.59 | −1.04 | 0.51 | | −1.04 | 0.59 | | 92.72 | −1.03 | 0.59 | | 92.56 | −1.04 | 0.55 | |
| | Average | 92.63 | −1.02 | 0.54 | 0.16 | −1.02 | 0.64 | 0.24 | 92.73 | −1.02 | 0.61 | 0.20 | 92.62 | −1.02 | 0.56 | 0.18 |
| | Dye area | 92.03 | 0.65 | 0.16 | | 1.81 | −0.04 | | 91.17 | 2.72 | −0.18 | | 90.48 | 4.16 | −0.44 | |
| | | 92.17 | 0.48 | 0.23 | | 1.56 | 0.03 | | 91.21 | 2.53 | −0.1 | | 90.66 | 3.62 | −0.37 | |
| | Average | 92.12 | 0.57 | 0.2 | 1.68 | 1.69 | −0.01 | 2.92 | 91.19 | 2.63 | −0.14 | 3.96 | 90.57 | 3.89 | −0.41 | 5.39 |
| | Time, hrs | | | | | | | | 4 | | | | 5 | | | |

TABLE 3

Color Development of IE 1-2 and CE 1-2 Over Hours 5 - 24

| | | Time, hrs | | | | | | | | | | |
|---|---|---|---|---|---|---|---|---|---|---|---|---|
| | | 6 | | | | 7 | | | | 24 | | |
| | | | | | | Color Value | | | | | | |
| | | L* | a* | b | ΔE | L* | a* | b | ΔE | L* | a* | b | ΔE |
| IE-1 | No dye | 92.43 | −0.98 | 0.4 | | 92.4 | −0.98 | 0.34 | | 92.5 | −0.99 | 0.39 | |
| | area | 92.18 | −1.03 | 0.4 | | 92.25 | −1.02 | 0.38 | | 92.43 | −1.01 | 0.39 | |
| | Average | 92.31 | −1.01 | 0.40 | 0.43 | 92.33 | −1.00 | 0.36 | 0.41 | 92.47 | −1.00 | 0.39 | 0 |
| | Dye area | 87.9 | 10.09 | −1.39 | | 86.83 | 12.64 | −1.78 | | 76.27 | 37.12 | −3.4 | |
| | | 87.25 | 10.74 | −1.52 | | 85.71 | 13.09 | −1.8 | | 75.33 | 38.24 | −3.56 | |
| | Average | 87.58 | 10.42 | −1.46 | 12.65 | 86.27 | 12.87 | −1.79 | 15.44 | 75.80 | 37.68 | −3.48 | 42 |
| CE-2 | No dye | 92.61 | −1.01 | 0.62 | | 92.43 | −0.98 | 0.75 | | 92.74 | −0.97 | 0.54 | |
| | area | 92.6 | −1.03 | 0.52 | | 92.59 | −1.03 | 0.46 | | 92.8 | −1.05 | −0.46 | |
| | Average | 92.61 | −1.02 | 0.57 | 0.29 | 92.51 | −1.01 | 0.61 | 0.39 | 92.77 | −1.01 | 0.04 | 0 |
| | Dye area | 92.59 | −0.86 | 0.49 | | 92.66 | −0.94 | 0.6 | | 92.5 | −0.39 | 0.36 | |
| | | 92.37 | −0.74 | 0.47 | | 92.44 | −0.69 | 0.43 | | 92.37 | 0.13 | 0.28 | |
| | Average | 92.48 | −0.80 | 0.48 | 0.43 | 92.55 | −0.82 | 0.52 | 0.37 | 92.44 | −0.13 | 0.32 | 1 |
| IE-2 | No dye | 92.64 | −1.02 | 0.56 | | 92.66 | −1.02 | 0.57 | | 92.77 | −0.98 | 0.51 | |
| | area | 92.59 | −1.01 | 0.45 | | 92.56 | −1 | 0.43 | | 92.81 | −1 | 0.42 | |
| | Average | 92.62 | −1.02 | 0.51 | 0.16 | 92.61 | −1.01 | 0.50 | 0.16 | 92.79 | −0.99 | 0.47 | 0 |
| | Dye area | 87.68 | 10.64 | −1.5 | | 85.92 | 14.56 | −2.06 | | 75.33 | 39.22 | −3.5 | |
| | | 87.02 | 11.65 | −1.66 | | 86.33 | 13.59 | −1.92 | | 75.58 | 38.63 | −3.52 | |
| | Average | 87.35 | 11.15 | −1.58 | 13.44 | 86.13 | 14.08 | −1.99 | 16.65 | 75.46 | 38.93 | −3.51 | 44 |
| CE-1 | No dye | 92.56 | −1.02 | 0.63 | | 92.59 | −0.98 | 0.64 | | 92.8 | −0.99 | 0.61 | |
| | area | 92.56 | −1.03 | 0.6 | | 92.64 | −1.03 | 0.54 | | 92.69 | −0.98 | 0.61 | |
| | Average | 92.56 | −1.03 | 0.62 | 0.26 | 92.62 | −1.01 | 0.59 | 0.20 | 92.75 | −0.99 | 0.61 | 0 |
| | Dye area | 89.9 | 5.59 | −0.69 | | 89.27 | 7.23 | −0.97 | | 81.35 | 26.59 | −3.44 | |
| | | 90.1 | 5.02 | −0.59 | | 89.81 | 6.18 | −0.74 | | 82.23 | 24.53 | −3.25 | |
| | Average | 90.00 | 5.31 | −0.64 | 6.93 | 89.54 | 6.71 | −0.86 | 8.41 | 81.79 | 25.56 | −3.35 | 29 |
| | Time, hrs | 6 | | | | 7 | | | | 24 | | | |

The color development results for IE-1 and IE-2 overlay almost identically. When comparing the color development results of IE-1 or IE-2 to the designs with the black ink flood coated on top of the red dye layer, CE-1 and CE-2, the delta E versus time is very different. For example, at time=7 hours, the CE-1 product has a delta E=8.41 versus a delta E=16.65 for IE-2 product. Therefore, the order of the red dye layer and the black layer is very critical for time indicator color development. The color development results were not anticipated, because the black and red layers are less than 0.25 mils dry thickness.

What is claimed is:
1. An inactive multilayer time indicator comprising:
(A) A multilayer first part comprising:
   (1) A transparent or translucent first substrate layer having opposing first and second facial surfaces;
   (2) A transparent or translucent enhancement layer having opposing first and second facial layers, the first facial surface of which is in contact with the second facial surface of the substrate layer;
   (3) An opaque timing layer having opposing first and second facial surfaces, the first facial surface of which is in contact with the second facial surface of the enhancement layer; and (B) A multilayer second part comprising:
(1) A dye layer comprising a dye and having opposing first and second facial surfaces, and, under ambient conditions, the dye:
(a) Will not migrate through the dark layer of (B)(2) below; and
(b) Will migrate through the timing layer and into the enhancement layer after contact with the timing layer; and
(2) A dark layer having:
(a) Opposing first and second facial surfaces, the first facial surface of which is in contact with the second facial surface of the dye layer; and
(b) An L* value of less than 70; and
(3) A second substrate layer having opposing first and second facial surfaces, the first facial surface of which is in contact with the second facial surface of the dark layer;
with the proviso that the dye of the second part is not in contact with the timing layer of the first part.

2. The inactive time indicator of claim 1 further comprising a release liner layer having opposing first and second facial surfaces, the first facial surface of which is in contact with the second facial surface of the timing layer.

3. The inactive time indicator of claim 1 in which the dye of the dye layer migrates into and through the timing layer upon contact with the timing layer.

4. The inactive time indicator of claim 1 in which the first facial surface of the first substrate layer is in contact with a reference ink.

5. The inactive time indicator of claim 4 in which the reference ink of the first part and the dye of the dye layer of the second part are of the same color.

6. The inactive time indicator of claim 1 in which the transparent or translucent first substrate layer comprises a clear polyester film.

7. The inactive time indicator of claim 1 in which the transparent or translucent enhancement layer comprises a pressure sensitive adhesive (PSA) and a plasticizer.

8. The inactive time indicator of claim 1 in which the opaque timing layer comprises a pressure sensitive adhesive (PSA), a plasticizer and a pigment.

9. The inactive time indicator of claim 8 in which the pigment of the opaque timing layer is titanium dioxide.

10. The inactive time indicator of claim 1 in which the second substrate is paper.

11. The inactive time indicator of claim 1 in which the dark layer comprises a polymer.

12. An inactive multilayer time indicator comprising:
(A) A multilayer first part comprising:
(1) A transparent or translucent first substrate layer having opposing first and second facial surfaces;
(2) A transparent or translucent enhancement layer having opposing first and second facial layers, the first facial surface of which is in contact with the second facial surface of the substrate layer;
(3) An opaque timing layer having opposing first and second facial surfaces, the first facial surface of which is in contact with the second facial surface of the enhancement layer; and
(B) A multilayer second part comprising:
(1) A dye layer comprising a dye and having opposing first and second facial surfaces, and, under ambient conditions, the dye will migrate through the timing layer and into the enhancement layer after contact with the timing layer; and
(2) A second substrate layer having:
(a) Opposing first and second facial surfaces, the first facial surface of which is in contact with the second facial surface of the dye layer; and
(b) An L* value of less than 70;
with the proviso that the dye of the second part is not in contact with the timing layer of the first part.

13. An activated, multilayer time indicator comprising:
(A) A transparent or translucent first substrate layer having opposing first and second facial surfaces;
(B) A transparent or translucent enhancement layer having opposing first and second facial layers, the first facial surface of which is in contact with the second facial surface of the substrate layer;
(C) An opaque timing layer having opposing first and second facial surfaces, the first facial surface of which is in contact with the second facial surface of the enhancement layer;
(D) A dye layer having opposing first and second facial surfaces, the first facial surface of which is in contact with the second facial surface of the timing layer and, under ambient conditions, the dye:
(1) Will not migrate through the dark layer of (E) below; and
(2) Will migrate through the timing layer and into the enhancement layer after contact with the timing layer;
(E) A dark layer having:
(1) Opposing first and second facial surfaces, the first facial surface of which is in contact with the migrating dye layer; and
(2) An L* value of less than 70; and
(F) A second substrate layer having opposing first and second facial surfaces, the first facial surface of which is in contact with the second facial surface of the dark layer.

* * * * *